United States Patent [19]

Kuttler et al.

[11] Patent Number: 4,469,367
[45] Date of Patent: Sep. 4, 1984

[54] SUPPORT FOR SUN VISORS

[75] Inventors: Otto Kuttler, Wertheim; Gerhard Mack, Rheinfelden-Adelhausen, both of Fed. Rep. of Germany

[73] Assignee: Gebr. Happich GmbH, Fed. Rep. of Germany

[21] Appl. No.: 472,961

[22] Filed: Mar. 7, 1983

[30] Foreign Application Priority Data

Mar. 27, 1982 [DE] Fed. Rep. of Germany ....... 8208831

[51] Int. Cl.³ .............................................. B60J 3/02
[52] U.S. Cl. ................................. 296/97 K; 403/155; 403/329; 403/397
[58] Field of Search ................ 296/97 K, 97 R, 97 H; 403/155, 397, 329; 160/DIG. 3

[56] References Cited

U.S. PATENT DOCUMENTS 4,070,054 1/1983 Cziptschirsch .................. 296/97 K
4,390,202 6/1983 Flowerday ...................... 296/97 K
4,428,612 1/1984 Viertel et al. ................... 296/97 K

FOREIGN PATENT DOCUMENTS 68269 1/1983 European Pat. Off. .......... 296/97 K
1354485 5/1974 United Kingdom ............. 296/97 K Primary Examiner—Robert R. Song
Attorney, Agent, or Firm—Ostrolenk, Faber, Gerb & Soffen

[57] ABSTRACT

The disclosure concerns a support for a sun visor. The support includes a flat support member and a clamping spring which wraps around the support shaft for the sun visor at a cutout in the flat support member. The spring extends from a web wrapped around the mounting shaft and has arms extending past the opposite surfaces of the support member to beneath the support member. One arm of the clamping spring terminates in a hook defined by two successive bends. The other arm terminates in an inclined extension, and the extension terminates at a hooking edge at the bend in the second arm defining the extension. The hook of the first arm hooks behind the hooking edge of the second arm. The extension on the second arm defines a bevel for guiding the hook of the first arm behind the hooking edge. The hooking edge is defined in a window cut into the extension of the second arm.

5 Claims, 5 Drawing Figures

SUPPORT FOR SUN VISORS

BACKGROUND OF THE INVENTION

The present invention generally relates to sun visors for automotive vehicles, particularly to the support for the sun visor, which connects the body of the sun visor to the mounting shaft, and more particularly to the design of the clamping spring which clamps the sun visor support to the mounting shaft.

A support for a sun visor, of which the present invention is an improvement, is known, for instance, from German Pat. No. 2,551,633. The sun visor support known from that patent includes a sun visor body which is supported on and swivelable about a mounting shaft which, in turn, is attached to the body of the vehicle. The support includes a flat support member that is attached to the sun visor body and which receives the mounting shaft. A clamping member attaches around the mounting shaft and to the support member on the body for securing the support member and body to the mounting shaft.

In the support disclosed in that patent, one clamping arm of the clamping member extends beneath the support member and has an extension which is bent at an angle toward the support member of the visor. That extension is developed as a V-shaped spring, and it is bent so that the reversed section of that V-shaped spring is directed toward the opposite arm of the clamping member. This means that the extension of the one arm is initially conducted just below the support member and than toward the opposite arm. The extension of the first arm is then bent shortly in front of the opposite arm and is then brought back up toward the hooking edge at a distance from the first extension part.

In this way, there is a relatively large distance between the lower edge of the support member and the hooking point. If the support member is now swung around the support shaft of the sun visor, the U-shaped clamping spring will be bent apart by the transfer from the flattened places on the support shaft to the round surface on the shaft. Also, the clamping arms, which previously rested closely against the support member, will now be lifted somewhat away from that support member, so that the support member can easily move back and forth in the enlarged space between the two clamping arms. If the sun visor is swung back into its engaged position and rotates around its mounting shaft, the spring arms strike against the support body, which produces an undesired amount of noise.

SUMMARY OF THE INVENTION

The object of the invention is to improve the clamp support in such a manner that the formation of the gap upon the swinging of the sun visor member and the disturbing noise resulting therefrom are avoided.

As in the known sun visor support, the sun visor body including the invention is provided with a support member which receives the mounting shaft of the sun visor. The support member has a cutout or window in it which exposes part of the length of the supporting shaft to a clamping support. The clamping support comprises a U-shaped spring with the web of the spring being wrapped around the mounting shaft at the window in the support member and with the arms of the spring extending down the opposite sides of the support member away from the shaft. The bottom ends of the arms of the clamping support spring extend below the bottom of the support member on the sun visor body.

The clamping member of the support in accordance with the invention has a first arm which terminates with an inwardly facing hook and a second arm which terminates with a hooking edge that is arranged in the plane of an angularly bent extension of the second arm and approximately in the region of the edge of the bend. The extension of the second arm terminates at a distance from the opposite, hook supporting first arm and is inclined below the arc of swing "S" of the opposite hook of the first arm to such an extent that the arm extension of the second arm serves as run-on bevel for the hook.

This development of the hook of the first arm and the hooking edge of the second arm enables the place of hooking to be directly below the support member which the clamping ars surround, so that upon bending apart of the U-shaped clamping spring at the shaft of the support, the lower region of the clamping spring does not lift away from the support member, for practical purposes. Another advantage is that material is saved due to the shortening of the angularly bent arm extension of the second arm, which has a favorable effect on the cost of manufacturing.

The hooking edge of the second arm can be formed by the edge of the bend between the second clamping arm and its angularly bent extension. A bend, which is as sharp as possible, is necessary for dependable rear engagement by the hook of the first arm on the hooking edge. It is even better however, if the hooking edge of the second arm is formed by a window cut into the extension of the second arm and so that the hook of the opposite first arm passes through the window to engage the hooking edge. In this case, the hook can be lowered so far within the window that it terminates in the plane of the second arm.

BRIEF DESCRIPTION OF THE DRAWINGS

One embodiment of the invention is shown in the accompanying drawings, in which.

DESCRIPTION OF A PREFERRED EMBODIMENT

Figure 5:
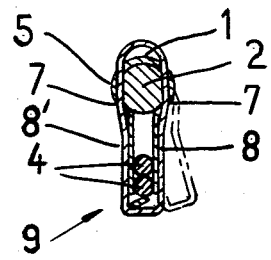
FIG. 5 is a section through the support along the line V—V of FIG. 4.
Figure 4:
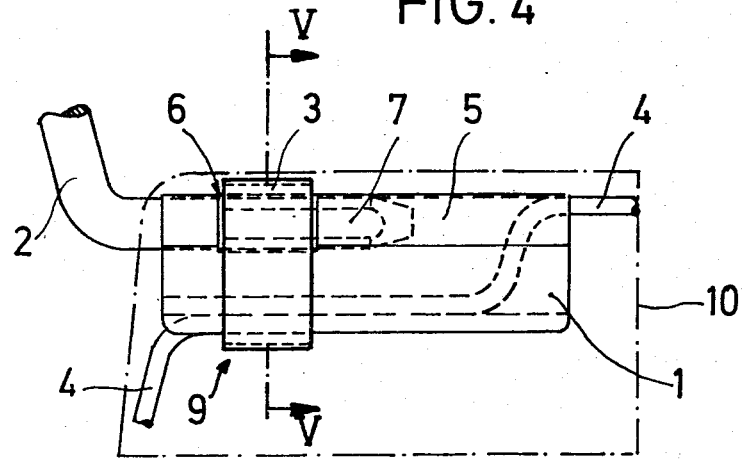
FIG. 4 is a partial view of a sun visor support with the clamping spring installed.

The sun visor support shown in FIGS. 4 and 5 includes a support member 1 having an approximately U-shape development, in cross section. The support member is swingably mounted on a visor support shaft 2 secured in the vehicle body. The support member 1 is welded to reinforcement wires 4 which extend around the sun visor 10 and impart stiffness to the sun visor. The visor body has a receiver 5 for the shaft 2. In the region of the receiver 5 for the support shaft 2, the support member 1 is widened in its cross section, corresponding to the diameter of the support shaft 2. On each side of the support member 1, in the region of the support receiver 5, there are coinciding cutouts 6. The parallel flats 7 of the support shaft 2 lie exposed within the cutouts 6.

Figure 3:
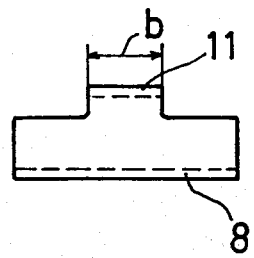
FIG. 3 is a view of the bent detent hook seen in the direction "B" in FIG. 1.

A U-shaped clamping spring 3 according to the invention grips from above and over the support member 1 in the region of the cutouts 6 to produce spring-urged surface contact with the flats 7 of the shaft 2. In the regions of the ends of the two arms 8, 8' of the U-shaped clamping spring 3, there is a hook development 9 formed of extensions of the arms, as will be explained below with reference to FIGS. 1 to 3.

Figures 1, 2:
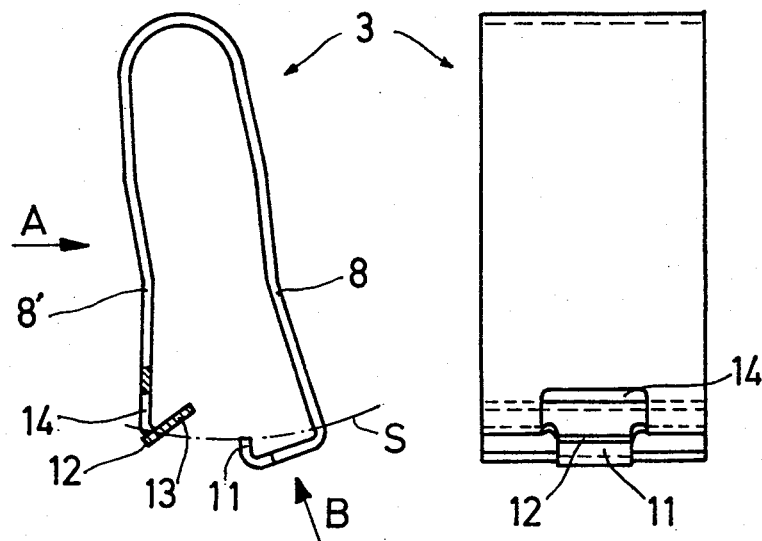
FIG. 1 is a side view of a clamping spring according to the invention.
FIG. 2 shows the clamping spring in the direction "A" in FIG. 1.

The first clamping arm 8, shown to the right in FIG. 1, is bent twice, both approximately at right angles, toward the support member 1. This forms a hook 11. The last bend section of the hook 11 is made short in length. When the hook 11 is in its position for use, i.e. in the installed condition of the clamping spring, it engages behind a hooking edge 12 on an extension 13 of the other left clamping arm 8'. The extension 13 is also bent toward the support member 1, and is located approximately in the region of the edge of the bend. This extension 13 extends away from and terminates at a distance from the arm 8 and it is so inclined with respect to the arc of swing "S" of the opposite hook 11 that the extension 13 serves as a run-on bevel for the hook 11.

The hooking edge 12 could be formed by the edge of the bend between the clamping arm 8' and the bent extension 13. Due to the radius of bend which must be maintained, the hook 11 would then, however, have to extend sufficiently far upward to pass over the rounding of the edge of the bend edge. In order to keep the hook 11 as short as possible, therefore, a window 14 is cut in the lower end of the clamping arm 8'. This window had the width "b" of the hook 11, as can be noted in FIG. 3. The hook 11 engages into the window 14. The hooking edge 12 in this case is formed by the bottom side of the window, which lies in the plane of the angularly bent extension 13.

Although the present invention has been described in connection with a preferred embodiment thereof, many variations and modifications will now become apparent to those skilled in the art. It is preferred, therefore, that the scope of the invention be limited not by the specific disclosure herein, but only by the appended claims.

What is claimed is:

1. A support for the body of a sun visor, comprising a support member connected to the visor body and for joining the visor body to a mounting shaft;

a generally U-shaped clamping spring, including a web portion which wraps around the mounting shaft and passes above the top of the support member and including first and second clamping arms which extend away from the web, down past the opposite sides of the support member;

the first arm of the clamping spring terminating at a hook defined by a first bend in the first arm, which bend defines a first section of the first arm that extends away from the first arm and toward the second arm, and defined by a second bend at the end of the first section of the first arm for defining a second hook section of the first arm, which second hook section is bent toward the web of the "U" and the support member; the second hook section terminating at a free edge; the hook being beneath the bottom of the support member;

the second arm of the clamping spring having a third bend located beneath the bottom of the support member for defining beyond the third bend a third arm section, which is inclined upward toward the "U" of the spring and toward the support member; the third section terminating a distance away from the second arm, to which the third section is attached at the first bend, and a distance away from the opposite first arm; approximately at the third bend, the second arm having a hooking edge, behind which the second section of the hook of the first arm is hookable; the hooking edge being located in the plane of the third section; the hooking edge of the second arm being located below the arc of swing of the free edge of the second section of the first hook as the clamping arms of the spring swing toward each other, such that the third section serves as an overridable bevel for the free edge of the second section of the hook to guide the free edge of the second section to the hooking edge of the second arm.

2. The support for sun visor of claim 1, wherein the third section of the second arm has a window cut into it, and the hooking edge is defined at an edge of the window, and the second section of the first arm rides into and hooks the hooking edge in the window.

3. The support for sun visor of claim 1, wherein the support member is flattened along its opposite sides past which the arms of the spring extend.

4. The support for sun visor of claim 3, wherein the mount includes a support shaft which is received in the support member; the support member having an opening therethrough for exposing the support shaft, and a clamping spring being wrapped around the support shaft at the opening in the support member.

5. The support for sun visor of claim 4, wherein the support shaft has flats on its periphery which are engaged by the spring.

* * * * *